United States Patent
Han et al.

(10) Patent No.: US 8,743,820 B2
(45) Date of Patent: Jun. 3, 2014

(54) PUCCH RESOURCE ALLOCATION WITH ENHANCED PDCCH

(71) Applicant: Intel Corporation, Santa Clara, CA (US)

(72) Inventors: Seunghee Han, Santa Clara, CA (US); Yuan Zhu, Beijing (CN); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 13/673,791

(22) Filed: Nov. 9, 2012

(65) Prior Publication Data

US 2013/0322352 A1    Dec. 5, 2013

Related U.S. Application Data

(60) Provisional application No. 61/653,369, filed on May 30, 2012, provisional application No. 61/707,784, filed on Sep. 28, 2012.

(51) Int. Cl.
*H04W 4/00* (2009.01)
*H04W 72/04* (2009.01)
*H04W 72/14* (2009.01)

(52) U.S. Cl.
CPC .......... *H04W 72/0406* (2013.01); *H04W 72/14* (2013.01)
USPC .......................................... 370/329; 370/341

(58) Field of Classification Search
CPC .............. H04W 72/04; H04W 72/042; H04W 72/0406; H04W 72/0413; H04W 72/0453; H04L 5/001; H04L 5/0053
USPC ......................................... 370/241, 310–350
See application file for complete search history.

(56) References Cited

U.S. PATENT DOCUMENTS

| | | | | |
|---|---|---|---|---|
| 2013/0194931 A1* | 8/2013 | Lee et al. | ...................... | 370/241 |
| 2013/0195019 A1* | 8/2013 | Lindh et al. | .................... | 370/329 |
| 2013/0230017 A1* | 9/2013 | Papasakellariou et al. | ... | 370/330 |
| 2013/0230029 A1* | 9/2013 | Papasakellariou et al. | ... | 370/336 |
| 2013/0230030 A1* | 9/2013 | Papasakellariou et al. | ... | 370/336 |
| 2013/0242882 A1* | 9/2013 | Blankenship et al. | ........ | 370/329 |
| 2013/0242904 A1* | 9/2013 | Sartori et al. | .................. | 370/329 |
| 2013/0315159 A1* | 11/2013 | Xia et al. | ...................... | 370/329 |

OTHER PUBLICATIONS

International Search Report and Written Opinion mailed Sep. 27, 2013 from International Application No. PCT/US2013/040614.
Samsung, "HARQ-ACK PUCCH Resources in Response to ePDCCH Detections," 3GPP TSG RAN WG1 #69, R1-122259, Agenda item: 7.6.5, May 21-25, 2012, Prague, Czech Republic, See pp. 1, 2.

(Continued)

*Primary Examiner* — Afsar M Qureshi
(74) *Attorney, Agent, or Firm* — Schwabe, Williamson & Wyatt, P.C.

(57) ABSTRACT

Embodiments of the present disclosure include methods, apparatuses, and instructions for receiving at a user equipment (UE) of a third generation partnership project (3GPP) network an offset value selected from a plurality of offset values in downlink control information. The UE also receives one or more enhanced control channel elements (eCCEs) of an enhanced physical downlink control channel (ePDCCH). The UE may then determine an allocation of an uplink resource for a transmission on a physical uplink control channel (PUCCH) based at least in part on the index of a first eCCE and the offset value.

25 Claims, 6 Drawing Sheets

(56) References Cited

OTHER PUBLICATIONS

Samsung, "PUCCH Resource Allocation for UL CoMP," 3GPP TSG RAN WG1 Meeting #69, R1-122247, Agenda item: 7.5.6.3, May 21-25, 2012, Prague, Czech Republic, See pp. 1-3.

Research in Motion, UK Limited, "Rel-11 Channel Selection Transmit Diversity Alternatives," 3GPP TSG RAN WG1 Meeting #69, R1-122725, Agenda Item: 7.2.1.3, May 21-25, 2012, Prague, Czech Republic, See pp. 1-7.

Pantech, "PUCCH resource allocation in response to E-PDCCH," 3GPP TSG RAN1 #69, R1- 122456, Agenda Item: 7.6.5, May 21-May 25, 2012, Prague, Czech Republic, See pp. 1-3.

LG Electronics, "Discussion on PUCCH Resource for ePDCCH," 3GPP TSG RAN WG1 Meeting #69, R1-122314, Agenda item: 7.6.5, May 21-25, 2012, Prague, Czech Republic, See pp. 1, 2.

3GPP, "PUCCH HARQ-ACK Resource Mapping for DL CA", 3GPP TSG RAN WG1 #62, R1-104582, Aug. 23-28, 2010, Madrid, Spain, 3 pages.

3GPP, "ACK/NACK resource allocation for FDD", 3GPP TSG RAN WG1 #62bis, R1-105339, Oct. 11-15, 2010, Xian, China, 9 pages.

3GPP, "HARQ-ACK PUCCH Resources in Response to E-PDCCH Detections", 3GPP TSG RAN WG1 #68bis, R1-121647, Mar. 26-30, 2012, Jeju, Korea, 2 pages.

3GPP, "Finalisation for introducing Rel-11 features," 3GPP TSG-RAN WG1 Meeting #71, R1-125404, Version 11.0.0, Nov. 12-16, 2012, New Orleans, USA, 152 pages.

* cited by examiner

| #m | #m+1 | #m+2 | #m+3 | #m+4 | #m+5 | #m+6 | #m+7 |

CCE/eCCE Index →

300

| DCI Offset | N offset (1) | N offset (2) | N offset (3) | N offset (4) | N offset (5) |
|---|---|---|---|---|---|
| 00 | 0 | -2 | -4 | -6 | 0 |
| 01 | 2 | 0 | -2 | -4 | 2 |
| 10 | 4 | 2 | 0 | -2 | 6 |
| 11 | 6 | 4 | 2 | 0 | 8 |

| DCI Offset | N offset (6) | N offset (7) |
|---|---|---|
| 0 | -2 | 0 |
| 1 | 0 | 2 |

| DCI Offset | N offset (8) | N offset (9) | N offset (10) |
|---|---|---|---|
| 00 | -4 | -2 | -2 |
| 01 | -2 | 0 | -1 |
| 10 | 0 | 1 | 0 |
| 11 | 1 | 2 | 2 |

PUCCH RESOURCE ALLOCATION WITH ENHANCED PDCCH

CROSS REFERENCE TO RELATED APPLICATIONS

The present application claims priority to U.S. Provisional Patent Applications No. 61/653,369, filed May 30, 2012, entitled "Advanced Wireless Communication Systems and Techniques," and No. 61/707,784, filed Sep. 28, 2012, entitled "Advanced Wireless Communication Systems and Techniques," the entire disclosures of which are hereby incorporated by reference in their entirety.

FIELD

Embodiments of the present invention relate generally to the technical field of resource allocation in third generation partnership project (3GPP) networks. Specifically, embodiments describe uplink resource allocation when a 3GPP network is sending downlink signals on both a physical downlink control channel (PDCCH) and an enhanced physical downlink control channel (ePDCCH).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In 3GPP network, the physical uplink control channel (PUCCH) is used to transmit uplink control information (UCI) from a UE to a 3GPP eNodebB (eNB). An example of the UCI information is an acknowledgement signal in a hybrid-ARQ (HARM) process. Typically, PUCCH resources are dynamically allocated to a mobile station based upon the lowest carrier control element (CCE) index of a signal transmitted on the PDCCH by the eNB using one or more CCEs. Because the PDCCH transmission is unique to a given UE, use of the CCE index would result in the UE being assigned a unique uplink resource on the PUCCH.

However, an ePDCCH using one or more enhanced carrier control elements (eCCEs) has recently been introduced to the 3GPP specifications. The uplink resource of the PUCCH may be based on the lowest eCCE index for one or more eCCEs used for a transmission on the ePDCCH. In certain instances the lowest CCE index and the lowest eCCE index may be the same. In these instances, an uplink resource allocated to a first UE using the lowest CCE index of the PDCCH may be the same as an uplink resource allocated to a second UE using the lowest eCCE index of the ePDCCH, resulting in a resource allocation collision.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 illustrates an exemplary uplink resource index, in accordance with various embodiments.

FIG. 3 illustrates exemplary uplink resource offset values, in accordance with various embodiments.

FIG. 4 illustrates other exemplary uplink resource offset values, in accordance with various embodiments.

FIG. 5 illustrates other exemplary uplink resource offset values, in accordance with various embodiments.

DETAILED DESCRIPTION

Apparatuses, methods, and storage media are described herein for allocating uplink resources. In certain embodiments, uplink resources related to a CCE and information received in a transmission on the PDCCH may be allocated according to a first set of values. Uplink resources related to an eCCE and information received in a transmission on the ePDCCH may be allocated according to a similar set of values with the addition of an offset value. In certain embodiments, for example when UEs are using transmit diversity for PUCCH, it may be desirable for the offset values to be even. In some embodiments, the offset values may be negative. In some embodiments, the offset values may be specifically signaled by the RRC or dictated by the antenna ports that are associated with the ePDCCH transmission. In certain embodiments, the resource allocation may be based at least in part on a starting offset value.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
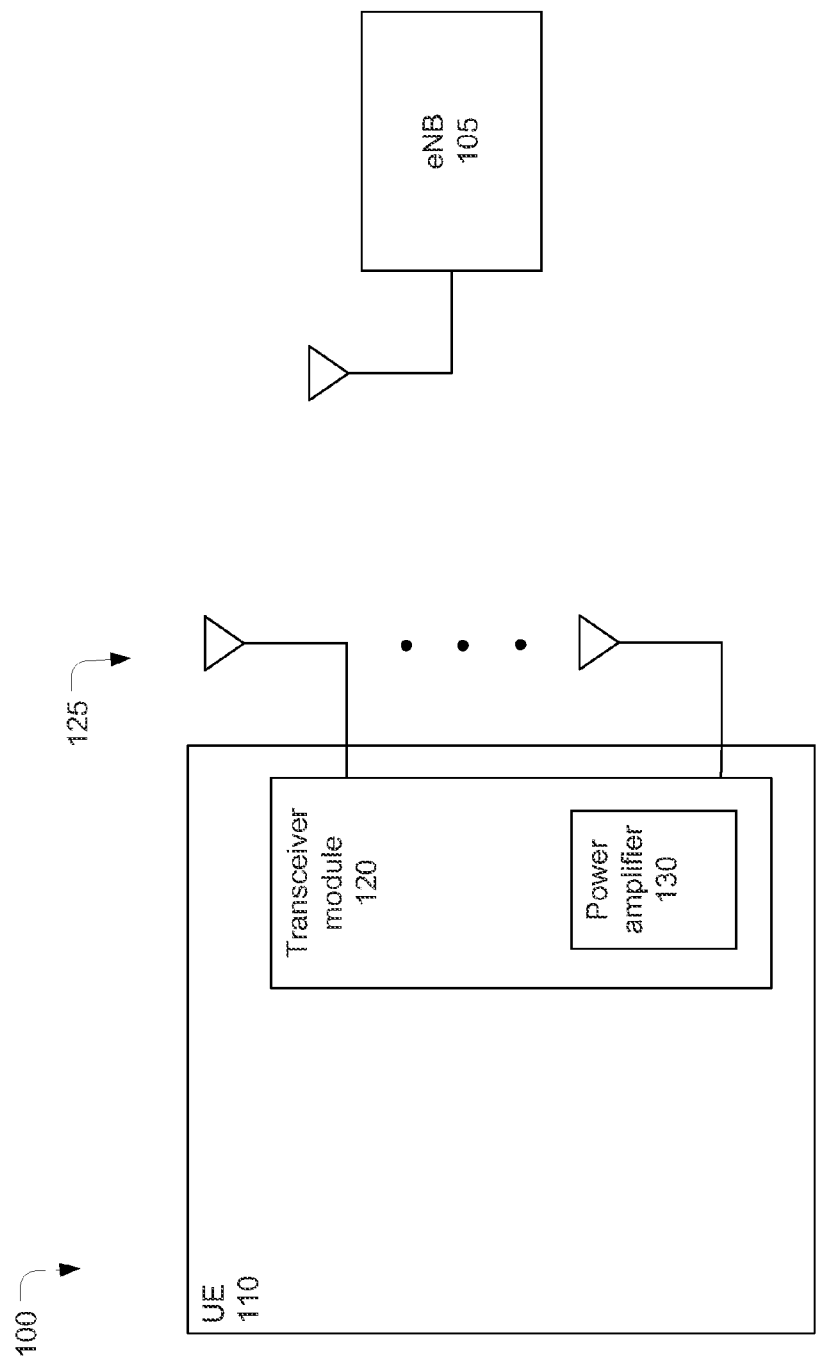
FIG. 1 schematically illustrates a high-level example of a network system comprising a UE and an eNB, in accordance with various embodiments.

FIG. 1 schematically illustrates a wireless communication network 100 in accordance with various embodiments. Wireless communication network 100 (hereinafter "network 100") may be an access network of a 3GPP LTE network such as evolved universal terrestrial radio access network (E-UTRAN). The network 100 may include an eNB 105, configured to wirelessly communicate with a UE 110.

As shown in FIG. 1, the UE 110 may include a transceiver module 120. The transceiver module 120 may be further coupled with one or more of a plurality of antennas 125 of the UE 110 for communicating wirelessly with other components of the network 100, e.g., eNB 105. The antennas 125 may be powered by a power amplifier 130 which may be a component of the transceiver module 120, as shown in FIG. 1, or may be a separate component of the UE 110. In one embodiment, the power amplifier 130 provides the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD). In certain embodiments the transceiver module 120 may contain both transmission and reception circuitry. In other embodiments, the transceiver module 120 may be replaced by transmitting circuitry and receiving circuitry which are separate from one another (not shown). In other embodiments, the transceiver module 120 may be coupled with processing circuitry configured to alter, process, or transform signals or data received from, or sent to, the transceiver module 120 (not shown).

Figure 2:
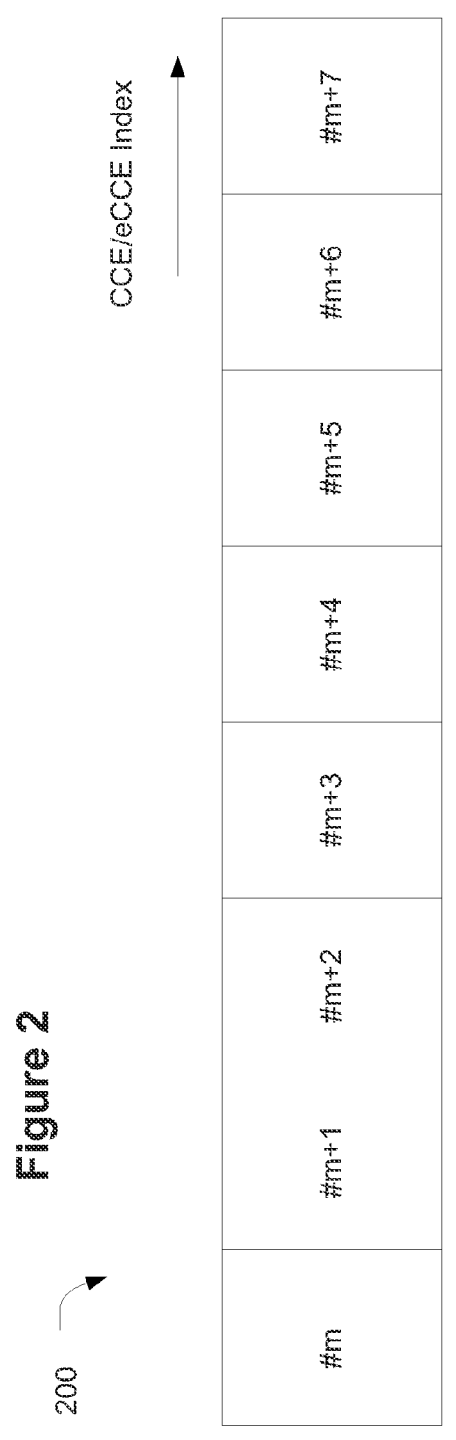

FIG. 2 depicts exemplary CCE/eCCE indices 200. The exemplary indices include a lowest index #m and sequentially increasing indices #m+1, #m+2 . . . #m+7. As described above, the lowest CCE index of a PDCCH transmission may, in some instances, be the same as the lowest eCCE index of an ePDCCH transmission. For example, the lowest CCE index and the lowest eCCE index may be the same, for example both using index #m+2. If the PUCCH transmissions of a first UE and the PUCCH transmissions of a second UE were scheduled using the CCE/eCCE index #m+2, the transmissions of PUCCHs may conflict due to using the same CCE/eCCE indices.

However, a conflicting transmission may be avoided if an offset value is used for dynamic resource allocation of uplink resources using an eCCE. In some embodiments the offset values may be configured by a radio resource control (RRC) entity of the network 100, however other entities may configure the offset values in other embodiments. In some embodiments the offset value may be an A/N Resource Indicator (ARI). In other embodiments the offset value may be related to the antenna port used by the eNB 105 to transmit data to the UE 110 on the ePDCCH.

As an example using the offset value, if a UE in a frequency division duplex (FDD) scenario is using transmit diversity for PUCCH such as SORTD, then the PUCCH resources of the UE may be allocated using the CCE index according to: $n_{PUCCH}^{(1,\tilde{p}0)}=n_{CCE}+N_{PUCCH}^{(1)}$ and $n_{PUCCH}^{(1,\tilde{p}1)}n_{CCE}+1+N_{PUCCH}^{(1)}$ for antenna ports 0 and 1, respectively, where $n_{PUCCH}^{(1,\tilde{p}0)}$ is the PUCCH resource for port 0, $n_{PUCCH}^{(1,\tilde{p}1)}$ is the PUCCH resource for port 1, $n_{CCE}$ is the CCE index and $N_{PUCCH}^{(1)}$ is a pre-configured value. In FDD carrier aggregation using PUCCH format 1b with channel selection, a PUCCH resource may be allocated according to $n_{PUCCH,j}^{(1)}=n_{CCE}+N_{PUCCH}^{(1)}$ and another PUCCH resource may be allocated according to $n_{PUCCH,j+1}^{(1)}=n_{CCE}+1+N_{PUCCH}^{(1)}$.

For a time division duplex (TDD) scenario, the resources for antenna ports 0 and 1 may be determined by $n_{PUCCH}^{(1,\tilde{p}0)}=$ value $+n_{CCE}+N_{PUCCH}^{(1)}$ and $n_{PUCCH}^{(1,\tilde{p}1)}=$value$+n_{CCE}+1+N_{PUCCH}^{(1)}$, respectively where value is a value associated with one or more of the specific subframes, a signaled value, a physical downlink shared channel, or a semi-persistent scheduling (SPS) value as described, for example, in 3GPP technical specification 36.213 v 10.5.0 (2012-03).

By contrast, the PUCCH resources of the UE in the FDD scenario may be allocated using the eCCE according to $n_{PUCCH}^{(1,\tilde{p}0)}=n_{eCCE}+N_{PUCCH}^{(1,k)}+n_{offset}$ and $n_{PUCCH}^{(1,\tilde{p}1)}=n_{eCCE}+1+N_{PUCCH}^{(1,k)}+n_{offset}$ for antenna ports 0 and 1, respectively where $N_{PUCCH}^{(1,k)}$ represents the UE specific starting offset for PUCCH resource for ePDCCH set k. In certain embodiments, there may be 2 ePDCCH sets, so k may be equal to 0 or 1, although in other embodiments there may be more or less ePDCCH sets or k may have some other value for a given ePDCCH set. Further, the PUCCH resources of the UE in the TDD scenario may be allocated using the eCCE according to $n_{PUCCH}^{(1,\tilde{p}0)}=$value$+n_{eCCE}+N_{PUCCH}^{(1,k)}+n_{offset}$, for antenna port 0 and $n_{PUCCH}^{(1,\tilde{p}0)}=$value$+n_{eCCE}+1+N_{PUCCH}^{(1,k)}+n_{offset}$, for antenna port 1.

In some embodiments, $n_{offset}$ may be an offset value that is transmitted to the UE via downlink control information (DCI) transmitted on the PDCCH or ePDCCH. As noted above, in some embodiments $n_{offset}$ may be an ARI. Alternatively, the offset value $n_{offset}$ may be an antenna specific offset $k_p$ associated with antenna port p, where p is the antenna port allocated to the first CCE of the corresponding ePDCCH. In embodiments utilizing distributed ePDCCH, $k_p$ may be equal to zero when p is equal to 107 or 109. In embodiments utilizing localized ePDCCH, $k_p$ may be equal to p−107 when p is equal to 107, 108, 109, or 110. In these embodiments, $n_{offset}$ may equal $2 \cdot m \cdot k_p$ where m is an integer. In certain embodiments, m may be equal to 1 and therefore $n_{offset}=2 \cdot k_p$.

In other embodiments, when using the antenna specific offset $k_p$, $n_{offset}$ may be equal to $k_p$, and the FDD resource allocation may then become $n_{PUCCH}^{(1,\tilde{p}0)}=n_{eCCE}+N_{PUCCH}^{(1,k)}+k_p$ and $n_{PUCCH}^{(1,\tilde{p}1)}=n_{eCCE}+1+N_{PUCCH}^{(1,k)}+k_p$ for antenna ports 0 and 1, respectively where $N_{PUCCH}^{(1,k)}$ represents the UE specific starting offset for PUCCH resource for ePDCCH set k, as described above. The TDD resource allocation may likewise become $n_{PUCCH}^{(1,\tilde{p}0)}=$value$+n_{eCCE}+N_{PUCCH}^{(1,k)}+k_p$, and $n_{PUCCH}^{(1,\tilde{p}1)}=$value$+n_{eCCE}+1+N_{PUCCH}^{(1,k)}+k_p$, for antenna ports 0 and 1, respectively.

In certain embodiments, a combination of the $n_{offset}$ values, for example a DCI signaled $n_{offset}$ value associated with ARI and an $n_{offset}$ value associated with an antenna specific offset value such as $k_p$ may be used. For ease of understanding the following example, the $n_{offset}$ associated with a DCI-signaled value such as an ARI will be referred to as $n_{ARI}$. The $n_{offset}$ associated with the antenna port will be referred to as $n_{antenna}$. It will be understood that $n_{antenna}$ may be equal to values such a $k_p$ or a multiplied value of $k_p$ such as $2k_p$ or $2mk_p$, as described above.

As an example, for localized ePDCCH transmission, the uplink resources in the FDD scenario may be allocated according to $n_{PUCCH}^{(1,\tilde{p}0)}=n_{eCCE}+N_{PUCCH}^{(1,k)}+n_{ARI}+n_{antenna}$ and $n_{PUCCH}^{(1,\tilde{p}1)}=n_{eCCE}+1+N_{PUCCH}^{(1,k)}+n_{ARI}+n_{antenna}$, for antenna ports 0 and 1, respectively. For distributed ePDCCH transmission, the uplink resources in the FDD scenario may be allocated according to $n_{PUCCH}^{(1,\tilde{p}0)}=n_{eCCE}+N_{PUCCH}^{(1,k)}+n_{offset}$ and $n_{PUCCH}^{(1,\tilde{p}1)}n_{eCCE}+1+N_{PUCCH}^{(1,k)}+n_{offset}$, for antenna ports 0 and 1, respectively.

For localized ePDCCH transmission, the uplink resources in the TDD scenario may be allocated according to $n_{PUCCH}^{(1,\tilde{p}0)}=$value$+n_{eCCE}+N_{PUCCH}^{(1,k)}+n_{ARI}+n_{antenna}$ and $n_{PUCCH}^{(1,\tilde{p}1)}=$value$+n_{eCCE}+1+N_{PUCCH}^{(1,k)}+n_{ARI}+n_{antenna}$, for antenna ports 0 and 1, respectively. For distributed ePDCCH transmission, the uplink resources in the TDD scenario may be allocated according to $n_{PUCCH}^{(1,\tilde{p}0)}=$value$+n_{eCCE}+N_{PUCCH}^{(1,k)}+n_{offset}$ and $n_{PUCCH}^{(1,\tilde{p}1)}=$value$+n_{eCCE}+1+N_{PUCCH}^{(1,k)}n_{offset}$, for antenna ports 0 and 1, respectively.

In certain embodiments, the RRC configuration $N_{PUCCH,ePDCCH}^{(1)}$ to indicate the starting offset for dynamic resource allocation may be introduced. In this embodiment, $N_{PUCCH,ePDCCH}^{(1)}$ may replace $N_{PUCCH}^{(1)}$ in the above equations for the FDD and TDD resource allocation.

FIG. 3 depicts exemplary $n_{offset}$ values 300 that may be signaled in various embodiments. As discussed above, the $n_{offset}$ values may be signaled via the DCI of the ePDCCH. In some embodiments, the discussed $n_{offset}$ values may be the ARI values discussed above. The exemplary $n_{offset}$ values 300 correspond to a set of values 305 signaled on the DCI.

In FIG. 3, a first set of $n_{offset}$ values 310 may correspond to the set of values 305 signaled on the DCI in a first embodiment. For example, an $n_{offset}$ of 0, 2, 4, or 6 may correspond to a DCI signal of 00, 01, 10, or 11, respectively. A second set of $n_{offset}$ values 315 may correspond to the set of values 305 signaled on the DCI in a second embodiment. For example, an $n_{offset}$ of −2, 0, 2, or 4 may correspond to a DCI signal of 00, 01, 10, or 11, respectively. A third set of $n_{offset}$ values 320 may correspond to the set of values 305 signaled on the DCI in a third embodiment. For example, an $n_{offset}$ of −4, −2, 0, or 2 may correspond to a DCI signal of 00, 01, 10, or 11, respectively. A fourth set of $n_{offset}$ values 325 may correspond to the set of values 305 signaled on the DCI in a fourth embodiment. For example, an $n_{offset}$ of −6, −4, −2, or 0 may correspond to a DCI signal of 00, 01, 10, or 11, respectively. A fifth set of $n_{offset}$ values 330 may correspond to the set of values 305 signaled on the DCI in a fifth embodiment. For example, an $n_{offset}$ of 0, 2, 6, or 8 may correspond to a DCI signal of 00, 01, 10, or 11, respectively.

It may be desirable for the $n_{offset}$ to be an even value so that a resource scheduler can consider two different resources for two antenna ports when using a transmit diversity configuration such as SORTD or for FDD carrier aggregation using PUCCH format 1b with channel selection to maximize the likelihood of collision avoidance. As shown above, uplink resource allocation between ports 0 and 1, or uplink resource allocation for PUCCH format 1b with channel selection, may be incremented by a value of 1. In other words, if port 0 uses an uplink resource corresponding to #m+2, then port 1 may use an uplink resource corresponding to #m+3. In this example, the uplink resource allocation corresponding to the eCCE may need to be incremented by an even value so that the uplink resource allocation of port 0 based on the eCCE does not collide with the uplink resource allocation of port 1 based on the CCE. For example, referring to FIG. 2, if the lowest CCE index is #m+2, and the lowest eCCE index is #m+4, then an $n_{offset}$ value of −1 may produce a collision because both the uplink resource allocation produced using the CCE for port 1 and the uplink resource allocation produced using the eCCE for port 0 may point to the uplink resource corresponding to #m+3. Alternatively, if the lowest CCE index is #m+2 and the lowest eCCE index is #m+2, then an $n_{offset}$ value of 1 may produce a collision because both the uplink resource allocation produced using the CCE for port 1 and the uplink resource allocation produced using the eCCE for port 0 may point to the uplink resource corresponding to #m+3.

As will be recognized, it may be desirable in certain embodiments for at least one of the possible $n_{offset}$ values to be 0 to allow for a neutralization of the $n_{offset}$ value if future standards revisions render the $n_{offset}$ value undesirable or obsolete. However, other $n_{offset}$ value sets may not include an $n_{offset}$ value of 0. In some embodiments, it may be desirable for at least one $n_{offset}$ value to be negative to account for a large aggregation level for previous PDCCHs, i.e. the number of consecutive CCEs used to transmit the previous PDCCHs, although other embodiments may have all positive (or all negative) $n_{offset}$ values. Finally, the $n_{offset}$ values shown in sets 310, 315, 320, 325, and 330 are merely exemplary and greater or lesser values may be desirable.

Using more or less bits to indicate the $n_{offset}$ value may be desirable to allow greater or lesser degrees of freedom in signaling an $n_{offset}$ value. For example, using 2 bits allows 4 degrees of freedom, however using 3 bits may allow 8 degrees of freedom, and using x bits may allow $2^x$ degrees of freedom. In some embodiments it may be desirable for the purposes of power savings or signal overhead to use only a single bit to signal the $n_{offset}$ value. In general the DCI bits for the offset can be defined by adding bits to an existing DCI field, or by reusing an existing field in the DCI.

Figure 4:
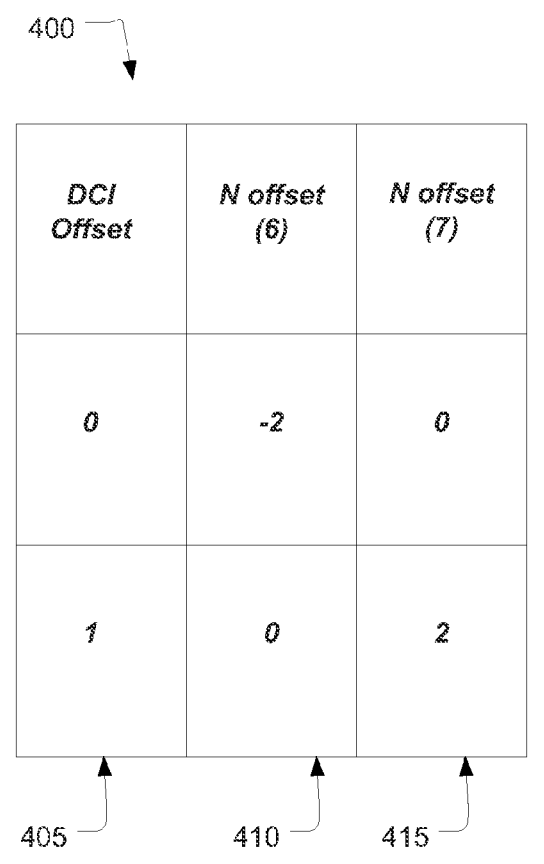

For example, FIG. 4 depicts exemplary $n_{offset}$ values 400 for embodiments where only a single bit is used in the set of values 405 signaled on the DCI. Similarly to FIG. 3, the discussed $n_{offset}$ values may be the ARI values discussed above. For example, a sixth set of $n_{offset}$ values 410 may correspond to the set of values 405 signaled on the DCI in a sixth embodiment. For example, an $n_{offset}$ of −2 or 0 may correspond to a DCI signal of 0 or 1, respectively. A seventh set of $n_{offset}$ values 415 may correspond to the set of values 405 signaled on the DCI in a seventh embodiment. For example, an $n_{offset}$ of 0 or 2 may correspond to a DCI signal of 0 or 1, respectively.

In some embodiments, the offset values may contain a combination of even and odd values. FIG. 5 depicts exemplary $n_{offset}$ values 500 for embodiments containing a combination of even and odd values. Similarly to FIGS. 3 and 4, the discussed $n_{offset}$ values may be the ARI values discussed above. In FIG. 5, an eighth set of $n_{offset}$ values 510 may correspond to the set of values 505 signaled on the DCI in an eighth embodiment. For example, an $n_{offset}$ of −4, −2, 0, or 1 may correspond to a DCI signal of 00, 01, 10, or 11, respectively. A ninth set of $n_{offset}$ values 515 may correspond to the set of values 505 signaled on the DCI in a ninth embodiment. For example, an $n_{offset}$ of −2, 0, 1, or 2 may correspond to a DCI signal of 00, 01, 10, or 11, respectively. A tenth set of $n_{offset}$ values 520 may correspond to the set of values 505 signaled on the DCI in a tenth embodiment. For example, an $n_{offset}$ of −2, −1, 0, or 2 may correspond to a DCI signal of 00, 01, 10, or 11, respectively.

The use of a combination of odd values and even values may be desirable for several reasons. First, a scaling value may be applied to maximize the flexibility of the $n_{offset}$ values. For example, if transmit diversity such as SORTD is not used in the PUCCH transmission, then a non-even $n_{offset}$ value may be acceptable. However, if the PUCCH is later transmitted using SORTD, then an even $n_{offset}$ value may be desirable. A combination of odd and even values may allow for both scenarios, because a scaling factor such as 2 may be applied so that the odd values become the even values desired for the SORTD transmission. As an example and referring to the $n_{offset}$ values 515 of the ninth embodiment, the use of a scaling factor such as 2 may make the values (−2, 0, 1, 2) become the even values (−4, 0, 2, 4). In some embodiments the RRC may configure the scaling factor, while in other embodiments the eNB may configure the scaling factor for use by the UE for the PUCCH transmission.

In certain embodiments where the ePDCCH is used in a stand-alone new carrier type (NCT), for example as a PCell, the above described embodiments may be altered. For example, the $n_{offset}$ value may be maintained considering possible future extensions such as downlink multiuser multiple-input and multiple output (MU-MIMO) or coordinated multipoint transmission (CoMP). Alternatively, the $n_{offset}$ value may be effectively removed, for example by always setting the $n_{offset}$ value to 0. In this instance the $n_{offset}$ value may be used as a virtual cyclic redundancy check (CRC) field. In other embodiments, the $n_{offset}$ value may be completely removed from the DCI.

As discussed above, in certain embodiments starting offsets for dynamic resource allocation may be provided by RRC parameters indicated by RRC signaling. In those embodiments, at least one $n_{offset}$ value may contain at least one of the RRC parameters. For example, denoting $N_{PUCCH}^{(1,k)}$ (where k=0, 1) as a UE-specific starting offset RRC parameter for ePDCCH set k, an $n_{offset}$ value may contain at least one of $N_{PUCCH}^{(1,k=0)}$ and/or $N_{PUCCH}^{(1,k=1)}$.

The UE specific starting offset values $N_{PUCCH}^{(1,k)}$ may help to efficiently use a given PUCCH resource region by using the RRC parameters in the $n_{offset}$ to offset the PUCCH parameters so that physical uplink shared channel (PUSCH) signals may also be transmitted in those PUCCH region depending on eNB scheduling.

In these embodiments, the offset values $n_{offset}$ may be 0, 2, $N_{PUCCH}^{(1,k=0)}$, or $N_{PUCCH}^{(1,k=1)}$. In these embodiments, the $n_{offset}$ parameters may therefore be a hybrid version of even number offset values and ePDCCH offset values, as described above. Other variants for $n_{offset}$ may include 0, N, $N_{PUCCH}^{(1,k=0)}+M_1$, or $N_{PUCCH}^{(1,k=1)}+M_2$ where N, M1, and M2 are the integer values. In this example, N, M1 and M2 may each be equal to 1 or −1. In some embodiments all three of the variables may be equal to one another, and in other embodiments at least one of the variables may have a value that is different from the other variables. In other embodiments, N may be equal to 1 or −1, and M1 and/or M2 may be equal to 0. In certain embodiments, N, M1, and M2 may be an even number such as 2, −2, or some other even number to avoid resource collisions by SORTD or FDD channel selection. For example, in these embodiments $n_{offset}$ may be 0, ±2, $N_{PUCCH}^{(1,k=0)}\pm 2$, $N_{PUCCH}^{(1,k=1)}\pm 2$ where "±A" represents +A or −A.

In a certain embodiments, the offset values $n_{offset}$ for an ePDCCH set k may be 0, 2, $N_{PUCCH}^{(1,k=0)}-N_{PUCCH}^{(1,k)}$, or $N_{PUCCH}^{(1,k=1)}-N_{PUCCH}^{(1,k)}$. In these embodiments the $n_{offset}$ parameters may therefore effectively change the UE specific starting offset for an ePDCCH set k into the signaled $n_{offset}$ value, for example the $n_{offset}$ indicated by ARI as described above. In other embodiments, other variants for $n_{offset}$ may include 0, N, $N_{PUCCH}^{(1,k=1)}-N_{PUCCH}^{(1,k)}+M_1$, or $N_{PUCCH}^{(1,k=1)}-N_{PUCCH}^{(1,k)}+M_2$ where N, M1, and M2 are integer values. In this example, N, M1 and M2 may each be equal to 1 or −1. In some embodiments all three of the variables may be equal to one another, and in other embodiments at least one of the variables may have a value that is different from the other variables. In other embodiments, N may be equal to 1 or −1, and M1 and/or M2 may be equal to 0. In certain embodiments, N, M1, and M2 may be an even number such as 2, −2, or some other even number to avoid resource collisions by SORTD or FDD channel selection. For example, in these embodiments $n_{offset}$ may be 0, ±2, $N_{PUCCH}^{(1,k=0)}-N_{PUCCH}^{(1,k)}\pm 2$, $N_{PUCCH}^{(1,k=1)}-N_{PUCCH}^{(1,k)}\pm 2$ where "±A" represents +A or −A. In embodiments where the starting offset for the second ePDCCH set k=1, $N_{PUCCH}^{(1,k=1)}$, is not configured, the value of $N_{PUCCH}^{(1,k=1)}$ may be replaced by cell specific starting offset $N_{PUCCH}^{(1)}$. In these embodiments, the values of $n_{offset}$ may then be 0, N, $N_{PUCCH}^{(1,k=0)}-N_{PUCCH}^{(1,k)}+M_1$, or $N_{PUCCH}^{(1)}-N_{PUCCH}^{(1,k)}+M_2$ where N, M1, and M2 are the integer values.

Figure 6:
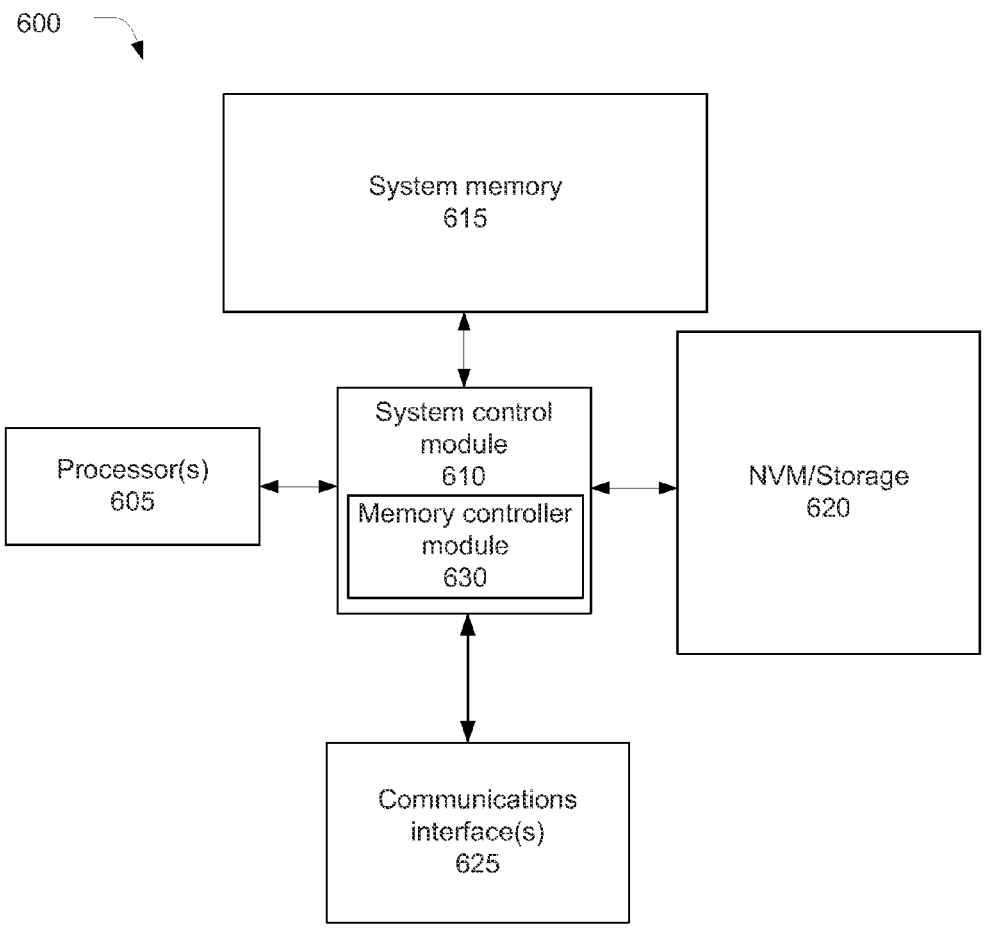
FIG. 6 schematically illustrates an example system that may be used to practice various embodiments described herein.

Embodiments of the present disclosure may be implemented into a system using any suitable hardware and/or software to configure as desired. FIG. 6 schematically illustrates an example system 600 that may be used to practice various embodiments described herein. FIG. 6 illustrates, for one embodiment, an example system 600 having one or more processor(s) 605, system control module 610 coupled to at least one of the processor(s) 605, system memory 615 coupled to system control module 610, non-volatile memory (NVM)/storage 620 coupled to system control module 610, and one or more communications interface(s) 625 coupled to system control module 610.

In some embodiments, the system 600 may be capable of functioning as the UE 110 as described herein. In other embodiments, the system 600 may be capable of functioning as the eNB 105 depicted in the embodiment shown in FIG. 1 or any one of the other described embodiments. In some embodiments, the system 600 may include one or more computer-readable media (e.g., system memory or NVM/storage 620) having instructions and one or more processors (e.g., processor(s) 605) coupled with the one or more computer-readable media and configured to execute the instructions to implement a module to perform actions described herein.

System control module 610 for one embodiment may include any suitable interface controllers to provide for any suitable interface to at least one of the processor(s) 605 and/or to any suitable device or component in communication with system control module 610.

System control module 610 may include memory controller module 630 to provide an interface to system memory 615. The memory controller module 630 may be a hardware module, a software module, and/or a firmware module.

System memory 615 may be used to load and store data and/or instructions, for example, for system 600. System memory 615 for one embodiment may include any suitable volatile memory, such as suitable DRAM, for example. In some embodiments, the system memory 615 may include double data rate type four synchronous dynamic random-access memory (DDR4 SDRAM).

System control module 610 for one embodiment may include one or more input/output (I/O) controller(s) to provide an interface to NVM/storage 620 and communications interface(s) 625.

The NVM/storage 620 may be used to store data and/or instructions, for example. NVM/storage 620 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 620 may include a storage resource physically part of a device on which the system 600 is installed or it may be accessible by, but not necessarily a part of, the device. For example, the NVM/storage 620 may be accessed over a network via the communications interface(s) 625.

Communications interface(s) 625 may provide an interface for system 600 to communicate over one or more network(s) and/or with any other suitable device. The system 600 may wirelessly communicate with the one or more components of the wireless network in accordance with any of one or more wireless network standards and/or protocols. For example, the communications interface(s) 625 may be coupled with the transceiver module 120 discussed above with respect to FIG. 1.

For one embodiment, at least one of the processor(s) 605 may be packaged together with logic for one or more controller(s) of system control module 610, e.g., memory controller module 630. For one embodiment, at least one of the processor(s) 605 may be packaged together with logic for one or more controllers of system control module 610 to form a System in Package (SiP). For one embodiment, at least one of the processor(s) 605 may be integrated on the same die with logic for one or more controller(s) of system control module 610. For one embodiment, at least one of the processor(s) 605 may be integrated on the same die with logic for one or more controller(s) of system control module 610 to form a System on Chip (SoC).

In various embodiments, the system 600 may be, but is not limited to, a server, a workstation, a desktop computing device, or a mobile computing device (e.g., a laptop computing device, a handheld computing device, a tablet, a netbook, etc.). In various embodiments, the system 600 may have more or less components, and/or different architectures. For example, in some embodiments, the system 600 includes one or more of a camera, a keyboard, liquid crystal display (LCD) screen (including touch screen displays), non-volatile memory port, multiple antennas, graphics chip, application-specific integrated circuit (ASIC), and speakers.

Methods and apparatuses are provided herein for dynamically allocating uplink control channel resources. In certain embodiments, a UE may receive an offset value on an ePDCCH. The UE may further receive one or more eCCEs of the ePDCCH. Then, the UE may determine allocation of an uplink resource of a PUCCH based at least in part on an index of a first eCCE of the one or more eCCEs and the offset value. In certain embodiments the offset value may be received in downlink control information transmitted in the ePDCCH, while in other embodiments the offset value may be based at least in part on an antenna port associated with the ePDCCH. In at least one embodiment the antenna port may be allocated to the first eCCE. In some embodiments the allocation of the uplink resource may be based at least in part on a UE specific starting offset value for a set of the ePDCCH. Additionally the offset value may be based on the UE specific starting offset value or a cell specific starting offset value. In some embodiments at least one of the plurality of offset values may be even or negative, and a scaling factor may be used to multiply the offset value. Additionally, the index of the first eCCE may be less than an index of other eCCEs of the one or more eCCEs.

Certain embodiments may further include an apparatus with receiving and processing circuitry configured to perform functions similar to the embodiments described above. Additionally, the receiving circuitry may be further configured to obtain one or more CCEs of a PDCCH, and the processing circuitry may determine a second allocation of an uplink resource of the PUCCH based at least in part on an index of a first CCE of the one or more CCEs. In some embodiments the first allocation and the second allocation may be different from one another.

Other embodiments may include a UE comprising a receiver configured to receive an offset value and one or more eCCEs of the ePDCCH. The UE may further comprise a processor configured to allocate an uplink resource of a PUCCH based at least in part on an index of a first eCCE of the one or more eCCEs and the offset value. The UE may also comprise a transmitter configured to transmit a signal on the physical uplink control channel using the first uplink resource.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. User equipment (UE) circuitry to:
   receive, on an enhanced physical downlink control channel (ePDCCH), an indication of an offset value;
   receive, on the ePDCCH, one or more enhanced control channel elements (eCCEs) of the ePDCCH;
   select, based on the indication of the offset value, an offset value from a table comprising a plurality of stored offset values, the plurality of stored offset values comprising offset values of −2, −1, 0, and 2; and
   determine allocation of an uplink resource of a physical uplink control channel (PUCCH) based at least in part on an index of a first eCCE of the one or more eCCEs and the selected offset value.

2. The UE circuitry of claim 1, wherein the UE circuitry is to receive the indication of the offset value in downlink control information transmitted in the ePDCCH.

3. The UE circuitry of claim 1, wherein the UE circuitry is to determine allocation of the uplink resource based at least in part on a multiplication of the selected offset value by a scaling factor.

4. The UE circuitry of claim 1, wherein the index of the first eCCE is less than an index of other eCCEs of the one or more eCCEs.

5. The UE circuitry of claim 1, wherein the UE circuitry is to determine allocation of the uplink resource based at least in part on a starting offset value for a set of the ePDCCH.

6. The UE circuitry of claim 5, wherein the starting offset value is a UE specific starting offset value.

7. The UE circuitry of claim 6, wherein the selected offset value further comprises the UE specific starting offset value or a cell specific starting offset value.

8. The UE circuitry of claim 1, wherein the UE circuitry is coupled with a graphics chip.

9. A user equipment (UE) comprising:
   receiving circuitry to:
     monitor an enhanced physical downlink control channel (ePDCCH) for an offset value of 2;
     obtain one or more enhanced control channel elements (eCCEs) of the ePDCCH; and
     obtain one or more control channel elements (CCEs) of a physical downlink control channel (PDCCH); and
   processing circuitry coupled with the receiving circuitry, the processing circuitry to:
     determine a first allocation of an uplink resource of a physical uplink control channel (PUCCH) based at least in part on an index of a first eCCE of the one or more eCCEs and the offset value; and
     determine a second allocation of an uplink resource of the PUCCH based at least in part on an index of a first CCE of the one or more CCEs, the first allocation and the second allocation being different from one another.

10. The UE of claim 9, wherein the offset value is signaled in downlink control information in the ePDCCH.

11. The UE of claim 9, wherein the processing circuitry is to determine the first allocation based at least in part on a result of the offset value multiplied by a scaling factor.

12. The UE of claim 9, wherein the index of the first eCCE is less than an index of other eCCEs of the one or more eCCEs.

13. The UE of claim 9, wherein the processing circuitry is to determine the first allocation of the uplink resource based at least in part on a starting offset value for a set of the ePDCCH selected from a plurality of sets of the ePDCCH.

14. The UE of claim 13, wherein the starting offset value is a starting offset value specific to the UE.

15. The UE of claim 14, wherein the offset value is based at least in part on the starting offset value or a starting offset value specific to a cell.

16. The UE of claim 9, wherein the offset value of 2 is selected from the set consisting of −2, −1, 0, and 2.

17. A user equipment (UE) comprising:
a receiver to receive an offset value of 2, and one or more enhanced control channel elements (eCCEs) of an enhanced physical downlink control channel ePDCCH;
a processor coupled with the receiver, the processor to allocate an uplink resource of a physical uplink control channel based at least in part on an index of a first eCCE of the one or more eCCEs and the offset value; and
a transmitter coupled with the processor, the transmitter to transmit a signal on the physical uplink control channel using the first uplink resource.

18. The UE of claim 17, wherein the receiver is to receive the offset value in downlink control information of the ePDCCH.

19. The UE of claim 17, wherein the processor is to allocate the uplink resource based at least in part on the offset value as multiplied by a scaling factor.

20. The UE of claim 17, wherein the index of the first eCCE is less than an index of other eCCEs of the one or more eCCEs.

21. The UE of claim 17, wherein the processor is to allocate the uplink resource based at least in part on a starting offset value for a set of the ePDCCH.

22. The UE of claim 21, wherein the starting offset value is specific to the UE.

23. The UE of claim 22, wherein the offset value is based at least in part on the starting offset value or on a starting offset value specific to a cell.

24. The UE of claim 17, wherein the offset value of 2 is selected from the set consisting of −2, −1, 0, and 2.

25. The UE of claim 17, further comprising a display coupled with the processor.

* * * * *